United States Patent
Yang

(10) Patent No.: US 12,458,193 B1
(45) Date of Patent: Nov. 4, 2025

(54) SCRAPER

(71) Applicant: Maya Technologies Limited, Hong Kong (CN)

(72) Inventor: Shanglin Yang, Hong Kong (CN)

(73) Assignee: Maya Technologies Limited, Hong Kong (CN)

( * ) Notice: Subject to any disclaimer, the term of this patent is extended or adjusted under 35 U.S.C. 154(b) by 0 days.

(21) Appl. No.: 19/189,307

(22) Filed: Apr. 25, 2025

Related U.S. Application Data

(63) Continuation-in-part of application No. 29/989,709, filed on Feb. 14, 2025, and a continuation-in-part of application No. 29/989,717, filed on Feb. 14, 2025.

(30) Foreign Application Priority Data

Apr. 1, 2025 (CN) .......................... 202520601429.X

(51) Int. Cl.
*A47L 13/08* (2006.01)
(52) U.S. Cl.
CPC .................................. *A47L 13/08* (2013.01)
(58) Field of Classification Search
CPC .................................. A47L 13/08; A47L 13/02
See application file for complete search history.

(56) References Cited

U.S. PATENT DOCUMENTS

| | | | | |
|---|---|---|---|---|
| 6,568,087 B1* | 5/2003 | Gringer | ................. | B23D 71/04 30/169 |
| 7,437,794 B2* | 10/2008 | Massaro | ................. | A47L 13/08 D32/46 |
| 7,565,747 B2* | 7/2009 | Cobb | ..................... | B26B 5/005 30/340 |
| 8,256,122 B2* | 9/2012 | Hatfield | ................. | B26B 29/06 30/172 |
| 8,302,317 B2* | 11/2012 | Lin | ........................ | A47L 13/08 30/169 |
| 10,926,424 B2* | 2/2021 | Scimone | .................. | B26B 1/10 |
| 2003/0110641 A1* | 6/2003 | Gringer | ................. | A47L 13/022 30/169 |
| 2019/0110642 A1* | 4/2019 | Thompson | .......... | A47J 37/0786 |
| 2020/0107691 A1* | 4/2020 | Scimone | ................. | B26B 5/001 |
| 2020/0108515 A1* | 4/2020 | Scimone | ................. | A47L 13/08 |

* cited by examiner

*Primary Examiner* — Omar Flores Sanchez

(57) ABSTRACT

A scraper includes: a housing, configured to enable an operating blade to be mounted thereon; a box body, defining a storage cavity to store at least one spare blade, where the storage cavity has an opening; at least one magnetic member, arranged on the housing and/or the box body. The at least one magnetic member is configured to apply a magnetic adsorption force on the at least one spare blade to fix the at least one spare blade in the storage cavity to prevent the at least one spare blade from detaching off from the opening.

20 Claims, 17 Drawing Sheets

SCRAPER

CROSS REFERENCE TO RELATED APPLICATIONS

The present application is a continuation-in-part of: the U.S. patent application Ser. No. 29/989,717, filed on Feb. 14, 2025, and the U.S. patent application Ser. No. 29/989,709, filed on Feb. 14, 2025; and claims the priority of the Chinese patent application No. 202520601429.X, filed on Apr. 1, 2025; and contents of which are incorporated herein by their entireties.

TECHNICAL FIELD

Embodiments of the present disclosure relate to the technical field of knives, and more specifically, to a scraper.

BACKGROUND

A scraper is a tool configured to clear wall stickers, automobile glass film, adhesive on flat surfaces, and so on. A replaceable blade is arranged at a head of the scraper to clear adhesions. The blade of the scraper may be worn out after being used for a large number of times. Therefore, a storage cavity is defined in a housing of the scraper to store a plurality of unused blades to facilitate blade replacement. In the art, the storage cavity of the scraper is unable to fix the stored blades, when the user wants to take out one blade from the storage cavity, other blades that the user does not want may be carried out together with the taken one blade. In this case, the other blades may fall out of the storage cavity, affecting the user experience.

SUMMARY

The present disclosure provides a scraper, including: a housing, configured to enable an operating blade to be mounted thereon; a box body, defining a storage cavity to store at least one spare blade, where the storage cavity has an opening; at least one magnetic member, arranged on the housing and/or the box body. The at least one magnetic member is configured to apply a magnetic adsorption force on the at least one spare blade to fix the at least one spare blade in the storage cavity to prevent the at least one spare blade from detaching off from the opening.

BRIEF DESCRIPTION OF THE DRAWINGS

In order to more clearly illustrate technical solutions in embodiments of the present disclosure, accompanying drawings used in the embodiments will be briefly introduced below. Obviously, the accompanying drawings in the following description show only some of the embodiments of the present disclosure, and any ordinary skilled person in the art may obtain other accompanying drawings based on these drawings without creative work.

REFERENCE NUMERALS IN THE DRAWINGS

Figure 1:
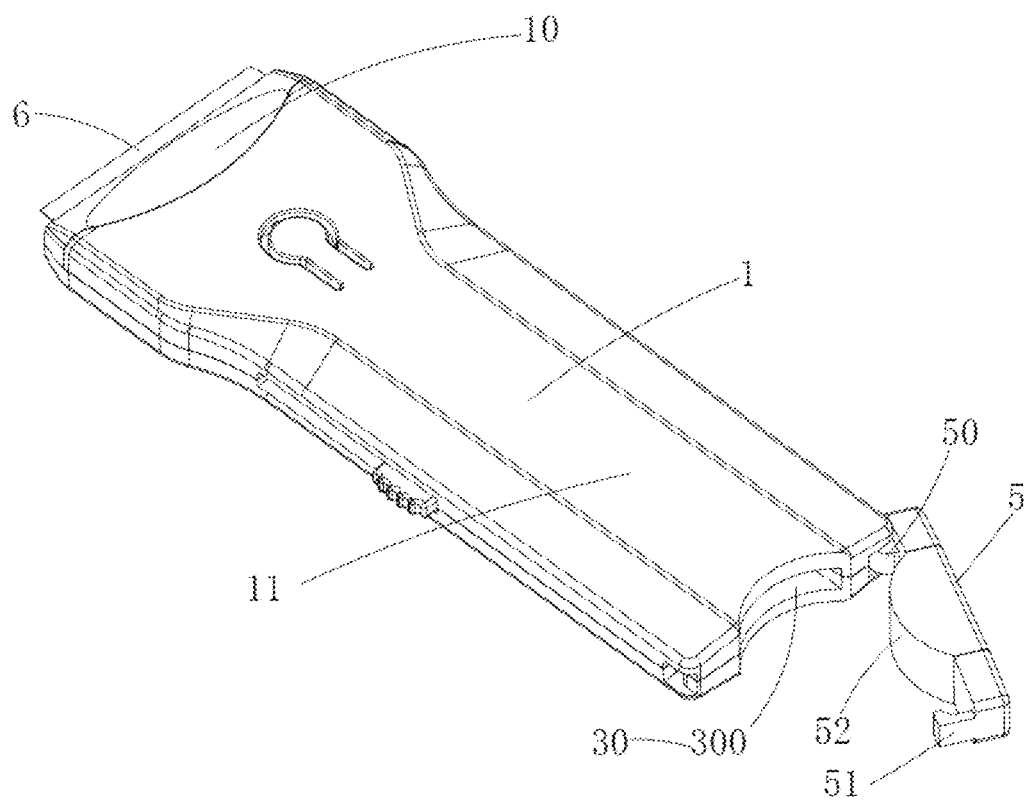
FIG. 1 is a structural schematic view of the entire scraper according to an embodiment 1 of the present disclosure.

1—housing; 10—operating end; 11—connection end; 12—connection cavity; 13—upper housing; 14—lower housing;
20—operating blade; 21—spare blade;
3—box body; 30—storage cavity; 300—opening; 301—first cavity wall; 302—second cavity wall; 3021—first side wall; 3022—second side wall; 303—receiving slot; 31—operating notch;
4—magnetic member;
5—cover; 50—hinge end; 51—snap end; 52—protruding portion;
6—handheld member; 60—limiting wall; 61—anti-slip structure.

DETAILED DESCRIPTIONS

Unless otherwise defined, all technical and scientific terms used herein have the same meaning as commonly understood by any ordinary skilled person in the art. The terms used herein in the specification of the present disclosure are used only for the purpose of describing specific embodiments and are not intended to limit the present disclosure. Terms "include", "have", and any variations thereof in the specification, claims and the accompanying drawings of the present disclosure are intended to cover non-exclusive inclusion. Terms "first", "second", and so on in the specification, claims, and the drawings of the present disclosure are used to distinguish between different objects and are not intended to describe a particular order.

Reference to "embodiments" herein implies that particular features, structures or characteristics described in an embodiment may be included in at least one embodiment of the present disclosure. Presence of the phrase at various sections in the specification does not necessarily refer to one same embodiment nor a separate or alternative embodiment that is mutually exclusive of other embodiments. Any ordinary skilled person in the art shall understand, both explicitly and implicitly, that the embodiments described herein may be combined with other embodiments.

In order to enable any ordinary skilled person in the art to better understand the embodiments of the present disclosure, technical solutions in the embodiments of the present disclosure will be clearly and completely described below by referring to the accompanying drawings.

As shown in FIGS. 1 to 17, the present disclosure provides a scraper including a housing 1, a box body 3 and at least one magnetic member 4. An operating blade 20 is mounted on the housing 1. Specifically, an end of the housing 1 is configured as an operating end 10. The operating blade 20 is mounted on the operating end 10 of the housing 1, enabling a user to hold the scraper for use. The box body 3 defines a storage cavity 30 therein to store spare blades 21. The storage cavity 30 has an opening 300. When the user needs to replace the operating blade 20 at the operating end 10, the user may take one of the spare blades 21 in the storage cavity 30 and mount the taken spare blade on the operating end 10. In order to fix the spare blades 21 stored in the storage cavity 30, the magnetic member 4 is arranged at a position on the housing 1 or the box body 3 near the storage cavity 30. In this way, a magnetic absorption force of the magnetic member 4 may be applied on the spare blades 21 inside the storage cavity 30 to fix the spare blades 21 inside the storage cavity 30. When the user takes one of the spare blades 21, the rest of the spare blades 21 are not taken out of the storage cavity together with the taken one. A situation of any other spare blade falling off during the user taking one spare blade 21 out of the storage cavity 30 can be avoided, such that the user experience is improved.

In some embodiments, the magnetic member 4 may be a permanent magnet, an electromagnet, a flexible magnetic block, a composite magnetic block, or any other magnetic structure that has the magnetic adsorption force on the metal blade. In the present embodiment, considering structural and production costs, a strip permanent magnet is configured as the magnetic member. To be noted that the magnetic adsorption force applied by the magnetic member 4 on the spare blades 21 is greater than a sum of a total metal adsorption force among a maximum permissible number of spare blades 21 stacked in the storage cavity 30 and a total gravitational force of all of the spare blades 21 stacked in the storage cavity 30. For example, when a first spare blade 21 is taken, the magnetic adsorption force of the magnetic member 4 needs to overcome following forces: a metal adsorption force between a target spare blade 21 (the one spare blade taken by the user) and another spare blade 21 adjacent to the target spare blade 21; and a gravitational force of the target spare blade 21. In this way, when one spare blade 21 is taken, the rest spare blades 21 stored in the storage cavity 30 are not taken along with the one spare blade 21.

Figure 11:
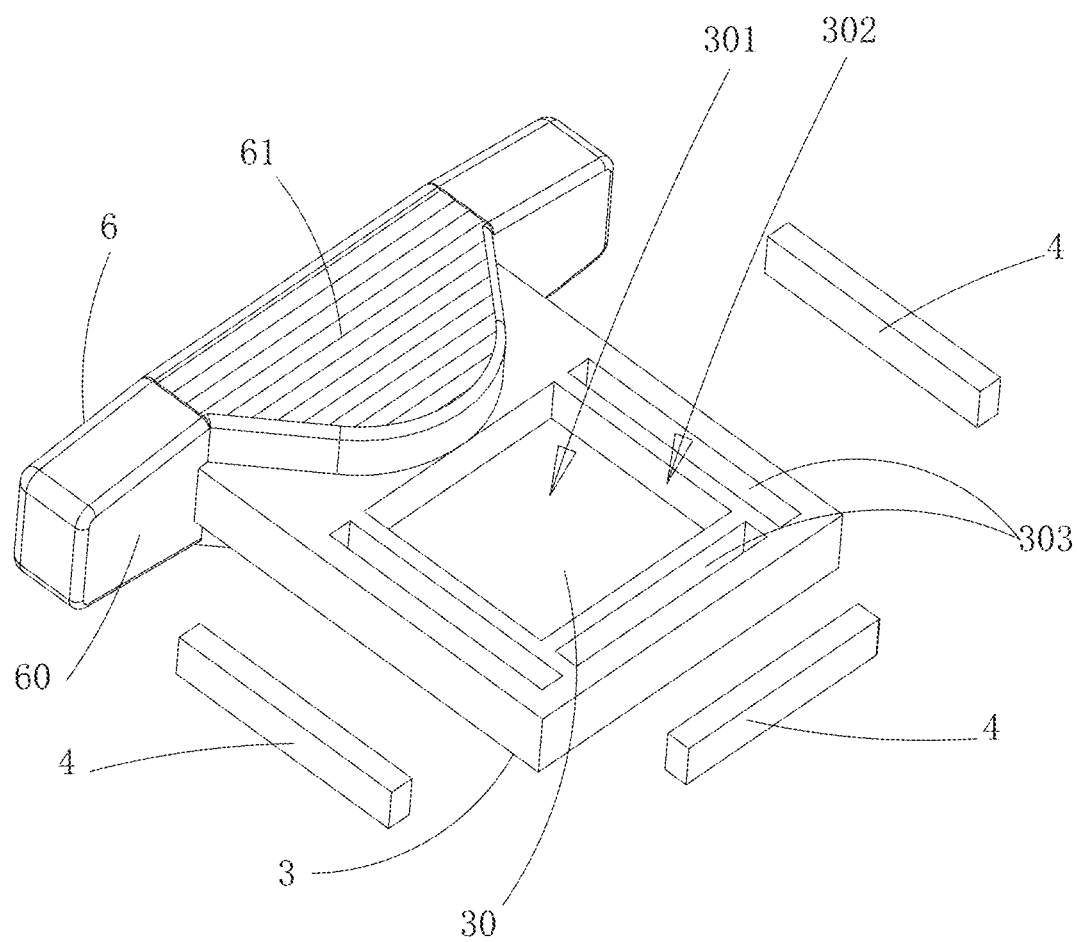
FIG. 11 is a structural schematic view of the box body according to the embodiment 2 of the present disclosure.
Figure 12:
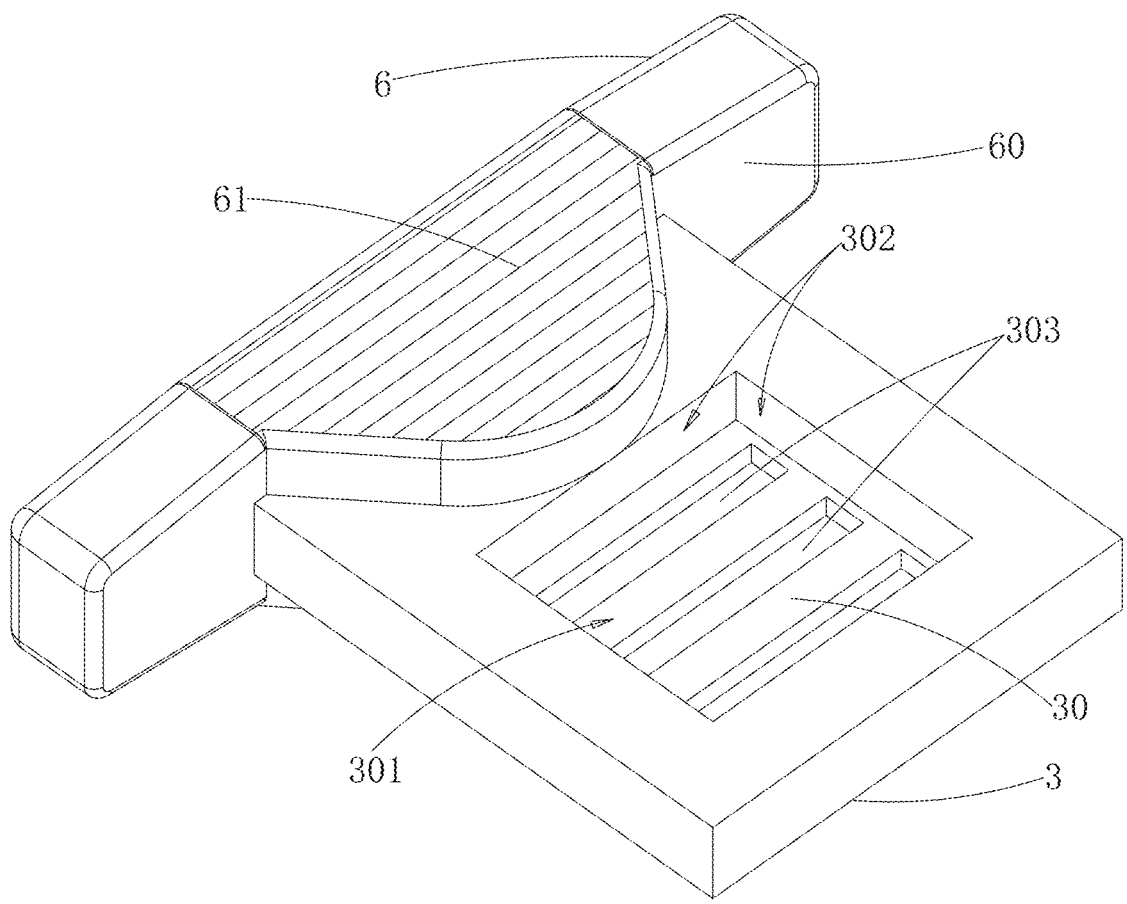
FIG. 12 is a structural schematic view 1 of the box body according to another embodiment of the present disclosure.

As shown in FIG. 3, FIG. 4, FIG. 5, FIG. 6, FIG. 11, FIG. 12, FIG. 13, and FIG. 14, the storage cavity 30 includes a plurality of cavity walls. In the present embodiment, the plurality of cavity walls include two first cavity walls 301 and three second cavity walls 302. The two first cavity walls 301 are spaced apart from each other and are parallel to each other. The three second cavity walls 302 are adjacent to each other sequentially. The three second cavity walls 302 are connected to both of the two first cavity walls 301 to cooperatively form the storage cavity 30. As shown in FIGS. 1, 11, 13, and 14, in some embodiments, the opening 300 is defined in any one of the three second cavity walls 302. As shown in FIG. 12, in other embodiments, the opening 300 is defined in any one of the two first cavity walls 301. After the spare blades 21 are stored in the storage cavity 30, the two first cavity walls 301 are substantially perpendicular to a thickness direction of the spare blades 21, and that is, a surface of the spare blade 21 is substantially parallel to the first cavity wall 301, and the three second cavity walls 302 are substantially parallel to the thickness direction of the spare blades 21. That is, the surface of the spare blade 21 is substantially perpendicular to the second cavity wall 302. It can further be interpreted as that, when the scraper is placed on a tabletop, the surface of the spare blade 21 is substantially attached to one of the two first cavity walls 301 disposed near a bottom of the scraper, and the three second cavity walls 302 are distributed at a lateral of the spare blades.

The magnetic member 4 may be mounted at the position of the box body 3 or housing 1 near the storage cavity 30. In some embodiments, the magnetic member 4 may be mounted on a cavity wall of the storage cavity 30. Specifically, the magnetic member 4 may be disposed on a surface of the cavity wall, an interlayer of the cavity wall, and so on.

Figure 3:
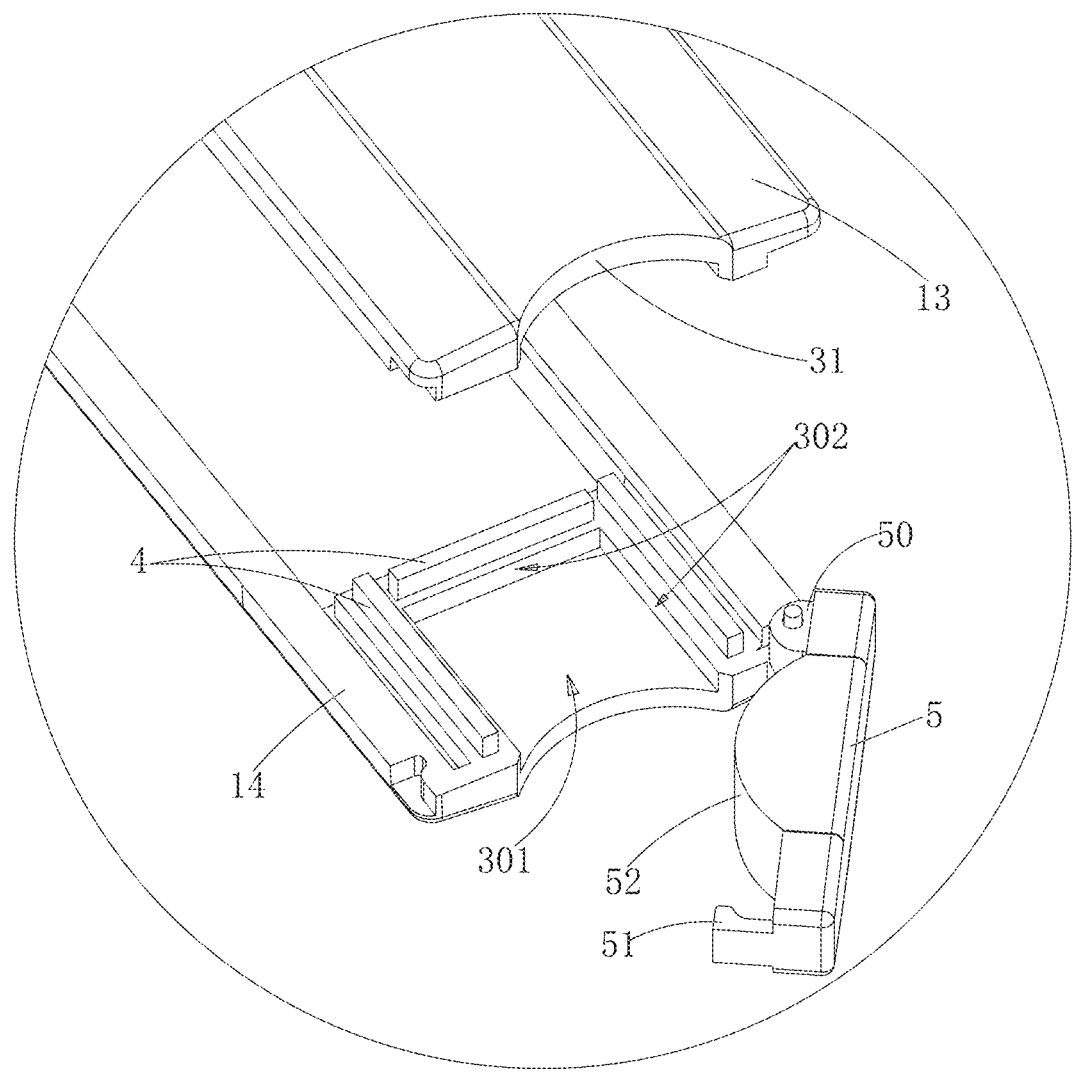
FIG. 3 is a structural schematic view 1 of a portion of the scraper according to the embodiment 1 of the present disclosure.
Figure 17:
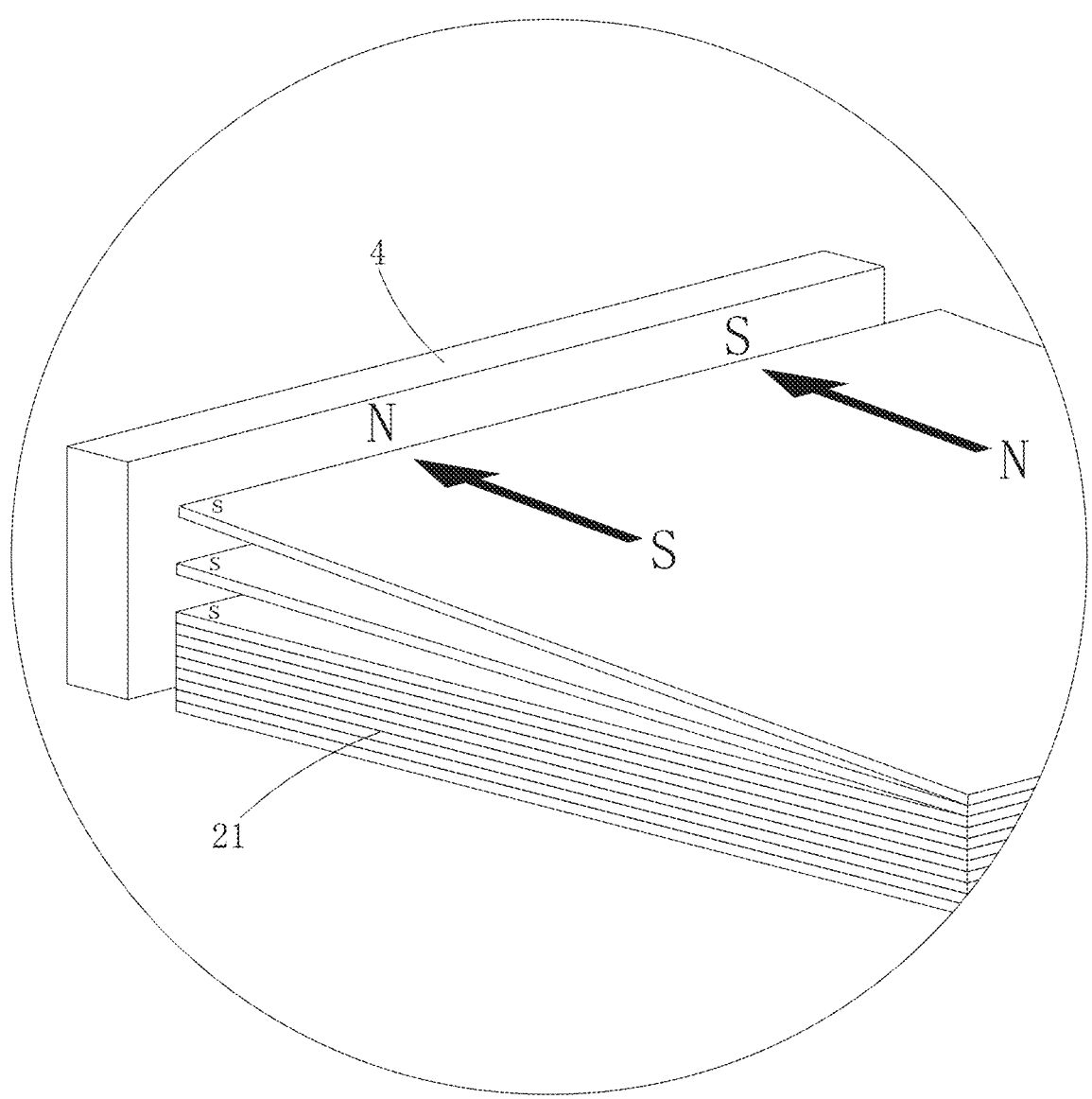
FIG. 17 is a schematic view showing an operating principle of taking the magnetic member to enable various blades to be separated from each other.

As shown in FIG. 6, FIG. 11, FIG. 13, and FIG. 14, in some embodiments, any one or two or three of the second cavity walls 302 each is arranged with one magnetic member 4. Since the at least one magnetic member 4 is distributed on the second cavity walls 302, the at least one magnetic member 4, while fixing the spare blades 21 inside the storage cavity 30, can also separate the spare blades 4 apart from each other, and this is because a magnetic field direction of the magnetic member 4 is parallel to an upper surface and a lower surface of the spare blades 21, and an inner magnetic domain of the spare blades 21 are magnetized to form a transverse magnetic moment. According to the magnetic charge theory, a repulsive force (as shown in FIG. 17) is generated between adjacent spare blades 21 due to proximity of same magnetic poles (N-N or S-S). The laterally distributed magnetic members 4 allow the repulsive force to be dominant, and that is, the repulsive force is greater than the metal adsorption force between the adjacent spare blades 21. In this way, different spare blades 21 are promoted to be separated. When the user is taking one spare blade 21 out of the storage cavity 30, one spare blade 21 can be easily taken out, and the one spare blade 21 is not attached to the rest of the spare blades 21, and therefore, the rest of the spare blades 21 in the storage cavity 30 are prevented from being taken out together. To be noted that each of the three second cavity walls 302 may be arranged with one magnetic member 4, or each of two second cavity walls 302 may be arranged with one magnetic member 4, or only one second cavity wall 302 may be arranged with one magnetic member 4. Different numbers of magnetic members 4 generate different effects on the spare blades 21 in the storage cavity 30. For example, as shown in FIG. 3, each of the three second cavity walls 302 is arranged with one magnetic member 4, a wrap-around magnetic field is formed in the storage cavity 30, both lateral sides and a rear of the spare blades 21 are subjected to the magnetic field. Therefore, the magnetic field inside the storage cavity 30 has a more comprehensive coverage, a uniform repulsive force is generated. With proximity of same poles, the lateral sides and the rear of the spare blades 21 are subjected to the repulsive force at the same time, forcing the spare blades 21 to move toward a center of the storage cavity 30, achieving equidistant separation. When the scraper is tilted or vibrating, the wrap-around magnetic field may provide multi-directional restriction, preventing the spare blades 21 from stacking or misaligning with each other.

Figure 5:
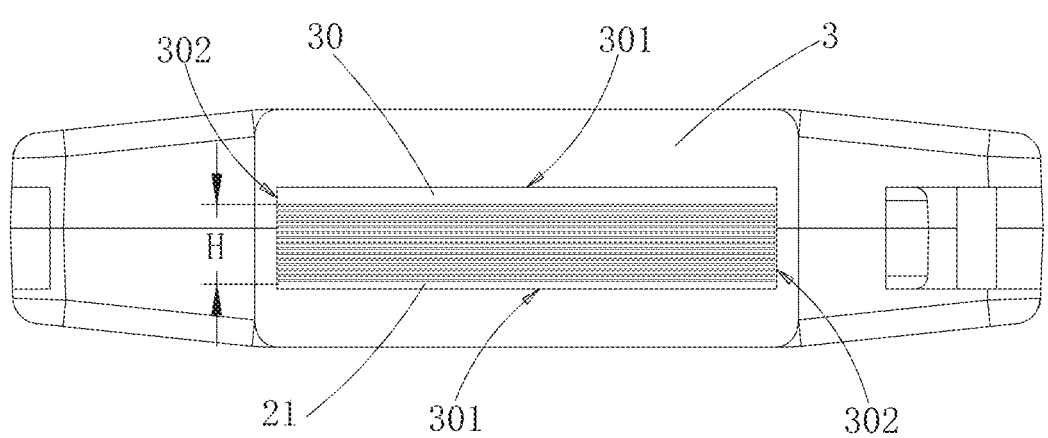
FIG. 5 is a front plane view of a box body according to the embodiment 1 of the present disclosure, where spare blades are stored in a storage cavity.
Figure 6:
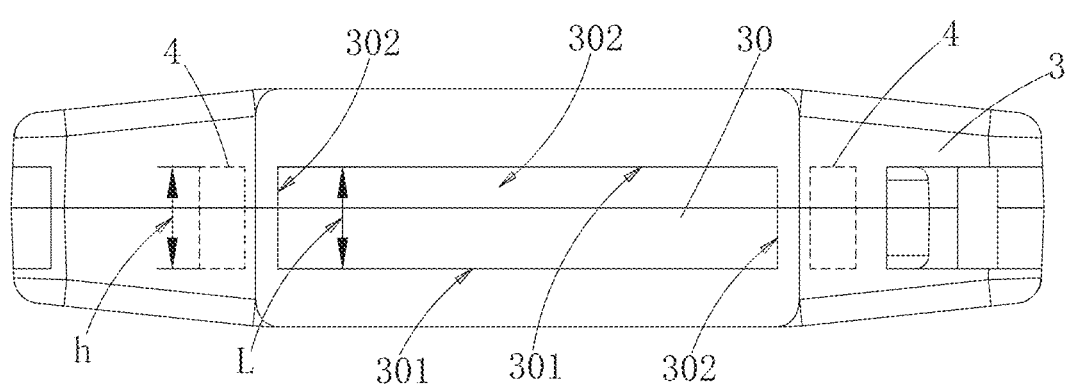
FIG. 6 is the front plane view of the box body according to the embodiment 1 of the present disclosure, where a magnetic member is arranged on a second cavity wall of the storage cavity.

In order to achieve effective separation between the spare blades 21, in some embodiments, along the thickness direction of the spare blades 21, a size h of the magnetic member 4 is greater than or equal to a size L of the storage cavity 30. As shown in FIGS. 5 and 6, in the present embodiment, the size L is a minimum spacing between the two first cavity walls 301, and the size h of the magnetic member 4 is equal to the size L of the storage cavity 30, such that the size h of the magnetic member 4 is similar to a total thickness H of a plurality of spare blades 21 when being stacked in the storage cavity 30. When the size h of the magnetic member 4 is much smaller than the total thickness H, for example, when h/H is less than 0.5, the magnetic field cannot fully cover all of the spare blades 21. In this case, a spare blade 21 at an edge may be separated, and spare blades 21 at a center region are attached to each other, such that the spare blade 21 at the edge may not be effectively separated. When the size h of the magnetic member 4 is excessively greater than the total thickness H, for example, when h/H is larger than 1.5, the magnetic field spreads excessively, the repulsive force attenuates, and the plurality of spare blades 21 may not be separated effectively.

Figure 2:
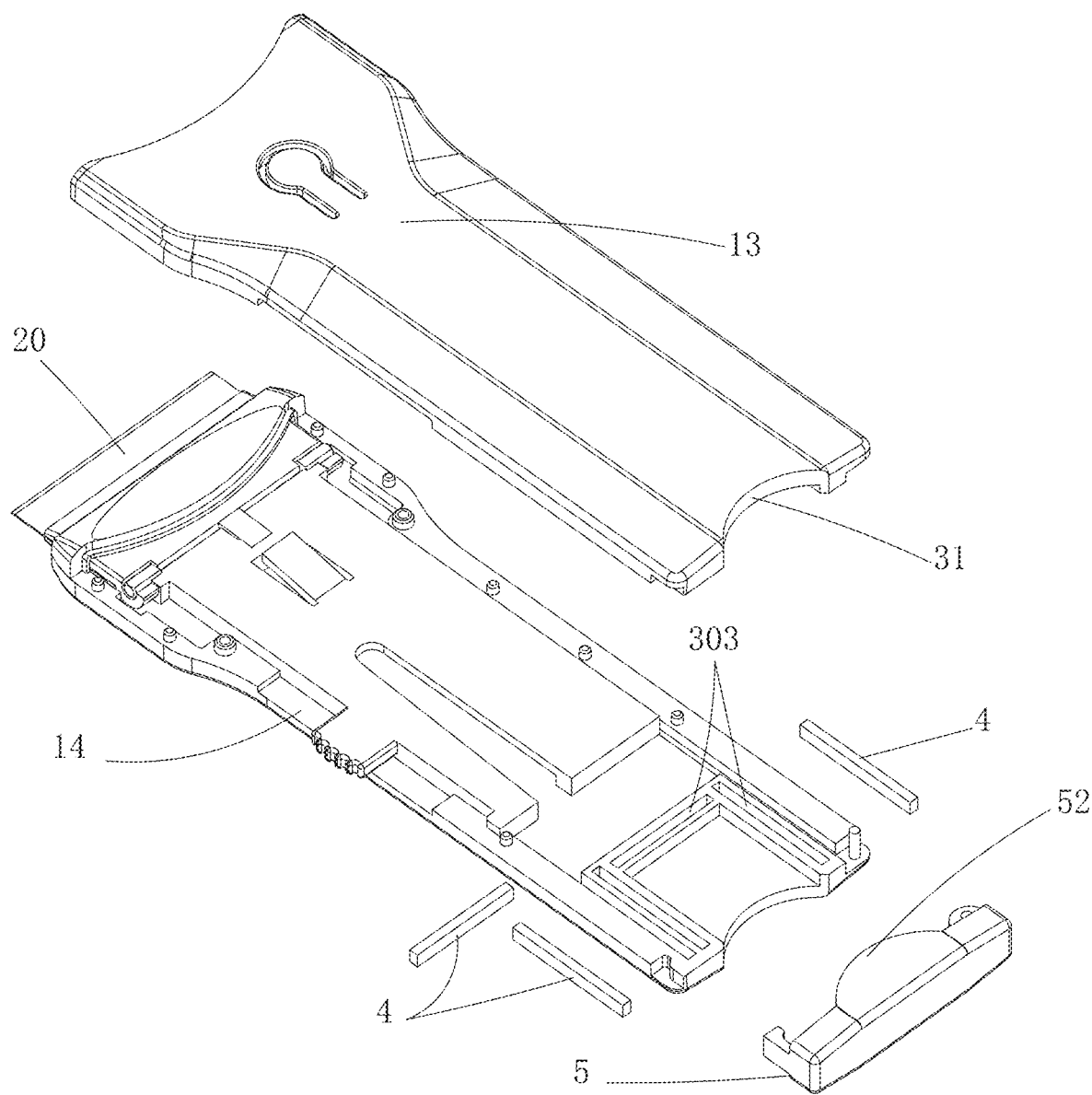
FIG. 2 is an exploded view of the scraper according to the embodiment 1 of the present disclosure
Figure 8:
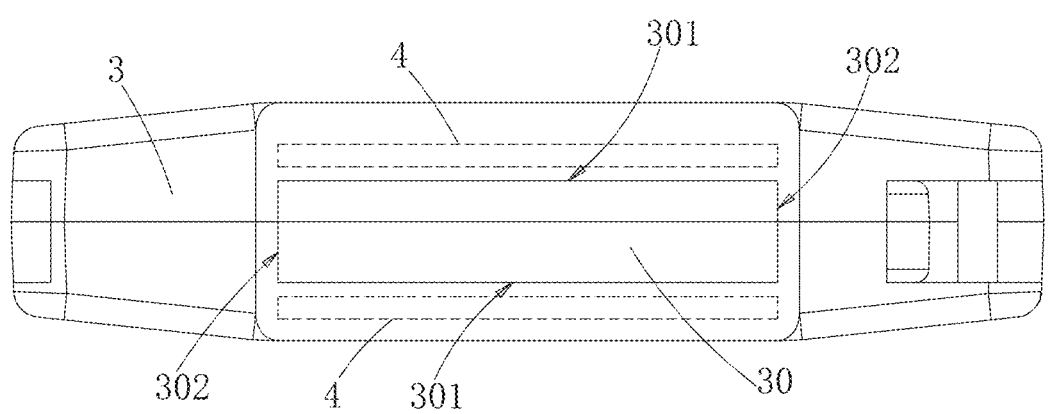
FIG. 8 is a front plane view of the box body according to another embodiment of the present disclosure, where the magnetic member is arranged on a first cavity wall of the storage cavity.

As shown in FIG. 8 and FIG. 2, in some embodiments, the magnetic member 4 may be mounted on the first cavity walls 301, and each of the two first cavity walls 301 is arranged with one magnetic member 4. In this case, the magnetic members 4 are distributed on the upper surface and the lower surface of the spare blades 21. The magnetic field direction of the magnetic members 4 passes perpendicularly through the spare blades 21 to form a closed magnetic circuit. The spare blades 21 are adsorbed by the magnetic member 4 onto the surface of the first cavity wall 301, and the magnetic member 4 can fix the spare blades 21 to the storage cavity 30 to prevent the spare blades 21 from being detached off from the storage cavity 30 through the opening 300.

Figure 13:
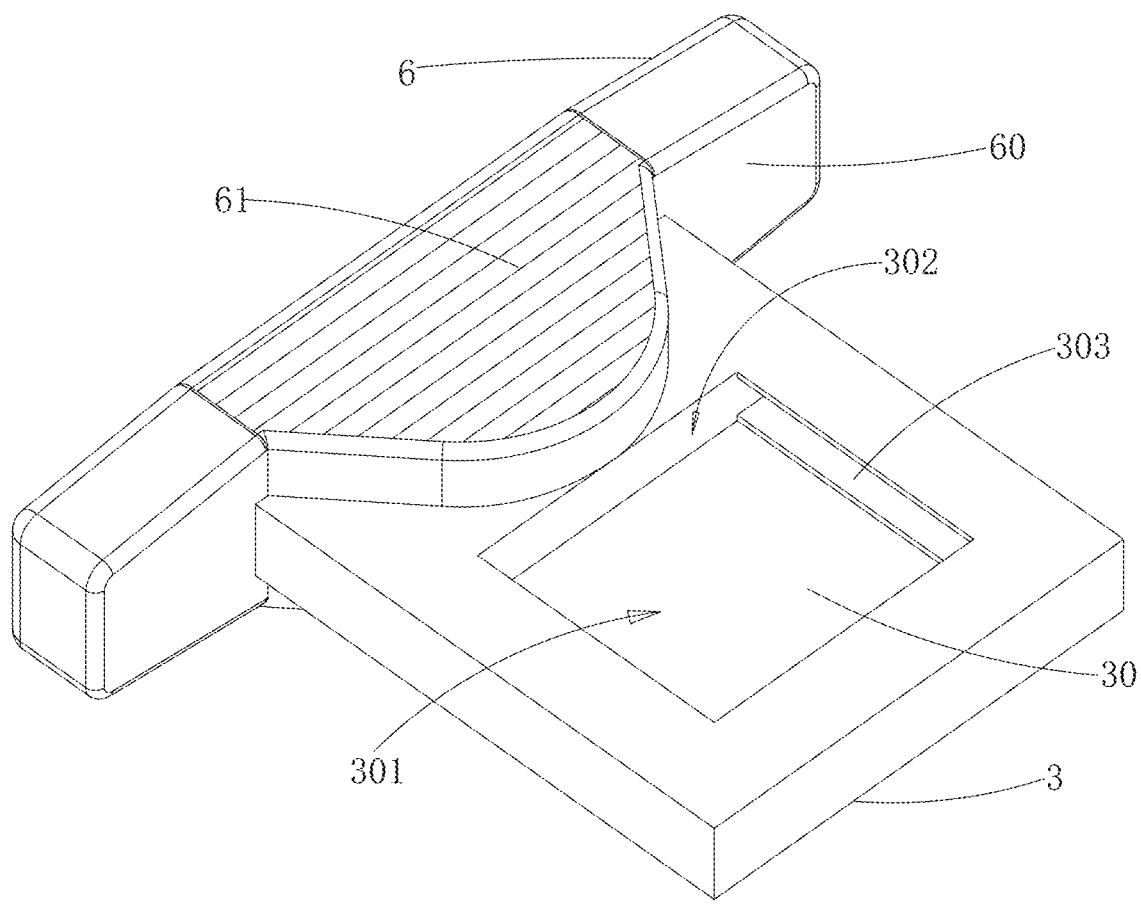
FIG. 13 is a structural schematic view 2 of the box body according to another embodiment of the present disclosure.
Figure 14:
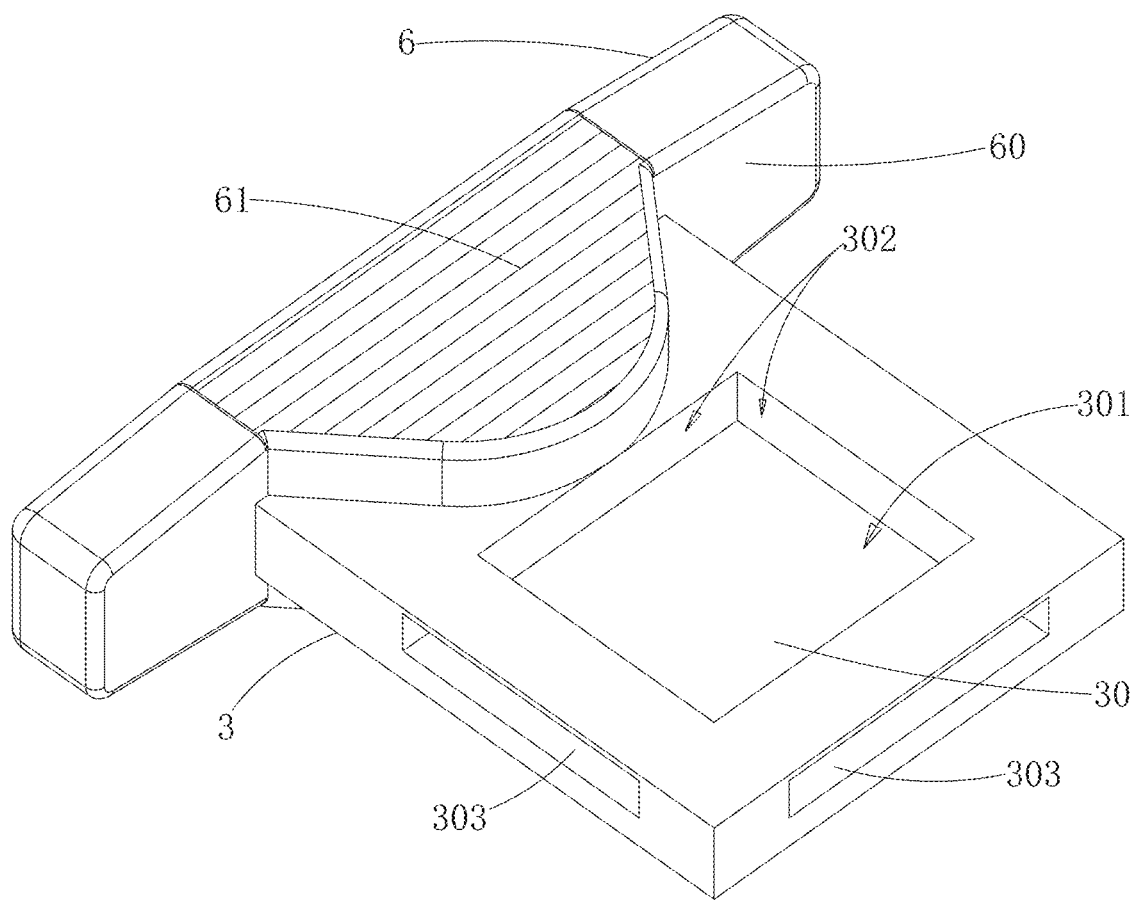
FIG. 14 is a structural schematic view 3 of the box body according to another embodiment of the present disclosure.
Figure 15:
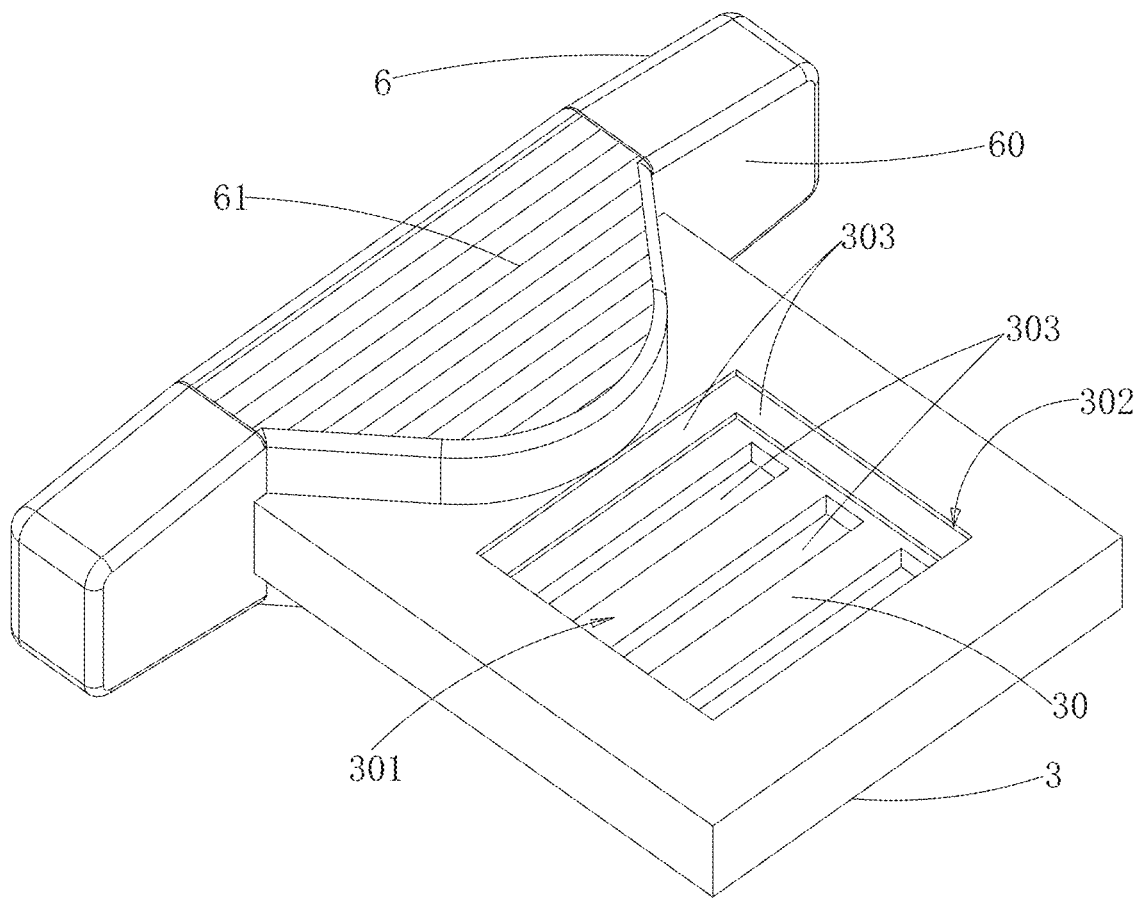
FIG. 15 is a structural schematic view 4 of the box body according to another embodiment of the present disclosure.
Figure 16:
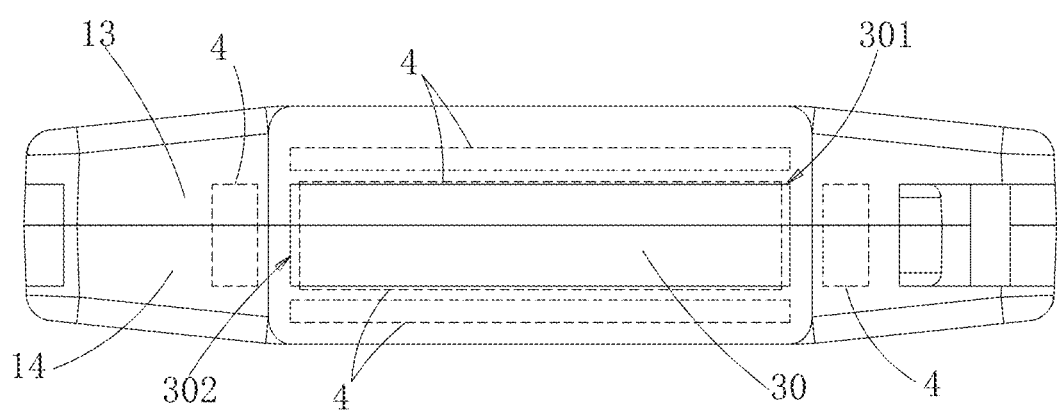
FIG. 16 is the front plane view of the box body according to another embodiment of the present disclosure, where each of the first cavity wall and the second cavity wall of the storage cavity is arranged with a magnetic member.

In some embodiments, a receiving slot 303 is defined in any one or more cavity walls. The magnetic member 4 is received in the receiving slot 303. The magnetic member 4 may be fixed in the receiving slot 303 by adhesive bonding, interference fit, and so on. specifically, the receiving slot 303 is defined in the first cavity wall 301 or the second cavity wall 302 to achieve different effects. As shown in FIG. 12, the receiving slot 303 is defined in the first cavity wall 301, a slot opening of the receiving slot 303 faces the storage cavity 30 to facilitate fixing of the magnetic member 4 inside the receiving slot 303. One or two or three receiving slots 303 may be defined. As shown in FIG. 11, the receiving slot 303 is defined in the second cavity wall 302, and the slot opening of the receiving slot 303 faces a same direction as the opening 300 of the storage cavity 30. Alternatively, as shown in FIG. 13, the slot opening of the receiving slot 303 faces toward an interior of the storage cavity 30. Alternatively, as shown in FIG. 14, the slot opening of the receiving slot 303 faces toward an exterior of the storage cavity 30. In some embodiments, each of more than one of the two first cavity walls 301 and the three second cavity walls 302 is arranged with a plurality of magnetic members 4. As shown in FIG. 15, the receiving slots 303 are defined in four second cavity walls 302 and one first cavity wall 301 of the storage cavity 30, and each receiving slot 303 receives one magnetic member 4 correspondingly. In some embodiments, as shown in FIG. 16, the magnetic members 4 are distributed on three second cavity walls 302 and two first cavity walls 301 of the storage cavity 30. By arranging the magnetic members 4 on the cavity walls of the storage cavity 30, the magnetic members 4 are disposed closer to the storage cavity 30 to increase the magnetic adsorption force applied by the magnetic members 4 on the spare blades 21.

As shown in FIG. 1-FIG. 8, in some embodiments, the housing 1 and the box body 3 are integrally formed as a one-piece structure. Specifically, the housing 1 includes a connection end 11. The connection end 11 is disposed opposite to the operating end 10. In other words, the operating end 10 is disposed at the head of the housing 1, and the connection end 11 is disposed at a tail of the housing 1, complying with customary usage habits. The box body 3 is formed by extending from the connection end 11, and as shown in FIG. 2, the housing 1 includes an upper housing 13 and a lower housing 14 engaged with the upper housing 13. The box body 3 is formed by the tail of the upper housing 13 and the lower housing 14. The storage cavity 30 is formed at the connection end 11 after the upper housing 13 and the lower housing 14 are engaged to each other. The opening 300 of the storage cavity 30 is located at an end of the housing 1 away from the operating end 10. Specifically, a notch defined in each of the tail of the upper housing 13 and the tail of the lower housing 14. When the upper housing 13 and the lower housing 14 are engaged to each other, the notch of the upper housing 13 and the notch of the lower housing 14 cooperatively form the storage cavity 30. To be noted that the upper housing 13 and the lower housing 14 are made of plastics, such that the upper housing 13 and the lower housing 14 are prevented from interfering with the magnetic member 4 arranged in the housing 1, ensuring the magnetic force of the magnetic member 4 to stably adsorb the spare blades 21 in the storage cavity 30.

As shown in FIG. 4-FIG. 8, in some embodiments, the storage cavity 30 includes two first cavity walls 301, which are respectively located in the upper housing 13 and the lower housing 14, and a plurality of second cavity walls 302 connected to the two first cavity walls 301. For example, the number of the plurality of second cavity walls 302 may be three. In this way, a cross section of the storage cavity 30 may be quadrilateral, corresponding to a shape of the spare blade 21, facilitating storage of the spare blades 21 in the storage cavity 30. In addition, due to the upper housing 13 and the lower housing 14 being separatable from each other, the second cavity walls 302 include a first side wall 3021 disposed in the upper housing 13 and a second side wall 3022 disposed in the lower housing 14. When the upper housing 13 and the lower housing 14 are engaged with each other, the second side wall 3021 and the second side wall 3022 abut against each other to form the second cavity wall 302.

Figure 7:
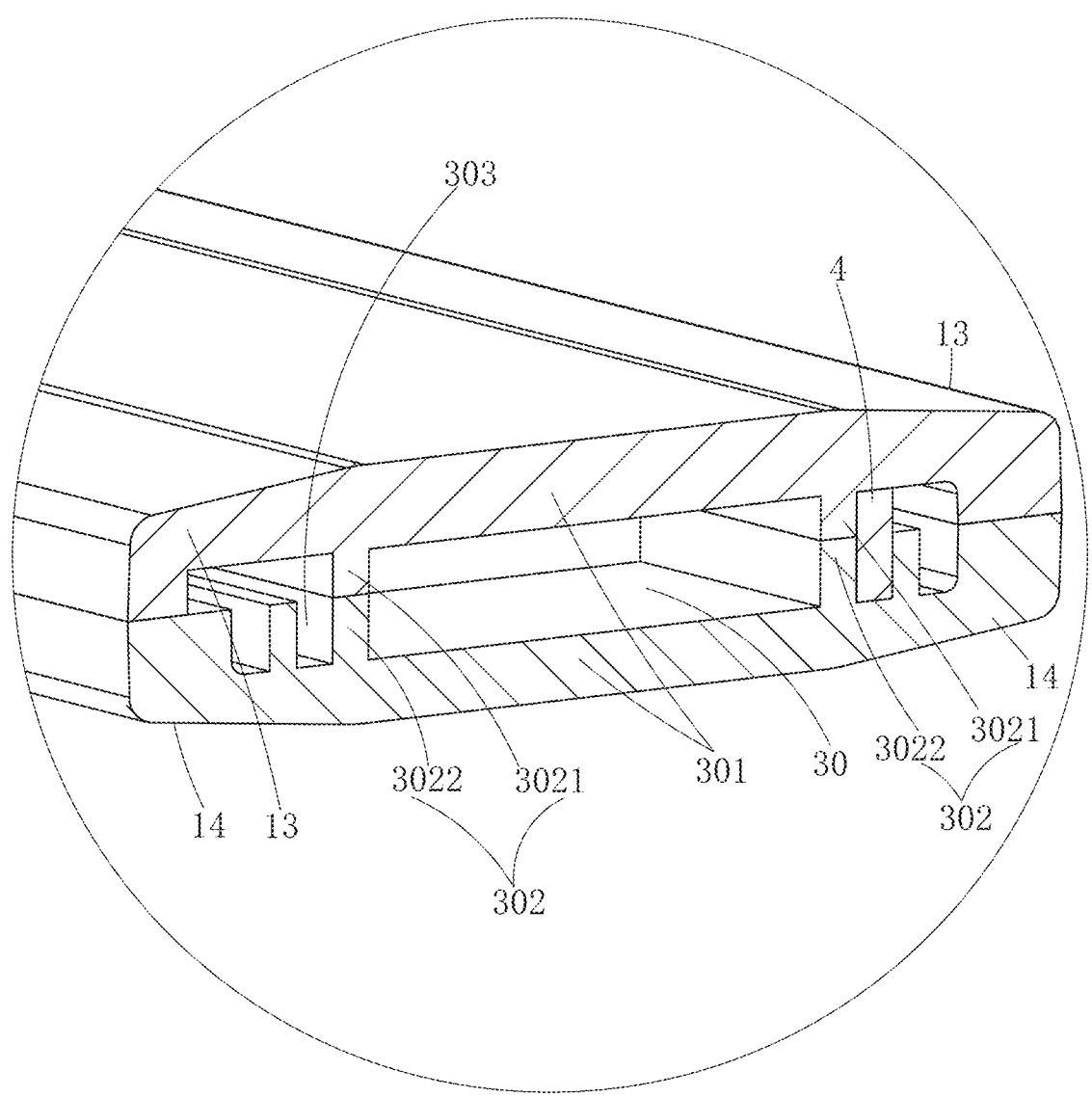
FIG. 7 is a perspective cross-sectional view of a portion of the scraper according to the embodiment 1 of the present disclosure.

As shown in FIG. 7, in some embodiments, in order to mount and fix the magnetic member 4 to adsorb the spare blades 21 in the storage cavity 30, receiving slots 303 may be defined in the upper housing 13 or the lower housing 14. As shown in FIG. 7, the lower housing 14 defines the receiving slot 303 for mounting the magnetic member, and the receiving slot 303 is located at an outer side of the second side wall 3022. The slot opening of the receiving slot 303 faces towards the upper housing 13. Before the upper housing 13 is engaged to the lower housing 14, the magnetic member 4 can be embedded in the receiving slot 303. After the upper housing 13 is engaged to the lower housing 14, an inner wall of the upper housing 13 limits a movement of the magnetic member 4. Specifically, the inner wall of the upper housing 13 abuts against the magnetic member 4 to limit the movement of the magnetic member 4, improving stability of the magnetic member 4 during the scraper being in use.

In some embodiments, especially when the box body 3 and the housing 1 are integrally formed as the one-piece structure, in order to prevent the spare blade 21 from detaching out of the storage cavity 30 through the opening 300, the scraper further includes a cover 5, and the cover 5 is mounted on the box body 3. The cover 5 is configured to close or open the opening 300, allowing the spare blade 21 to be taken out and placed therein. As shown in FIG. 5, the opening 300 is located between two first cavity walls 301 and two second cavity walls 302. When the cover 5 closes the opening 300, the cover 5 simultaneously presses against an end of each of the two first cavity walls 301 and the two second cavity walls 302, thereby closing the opening 300.

Figure 4:
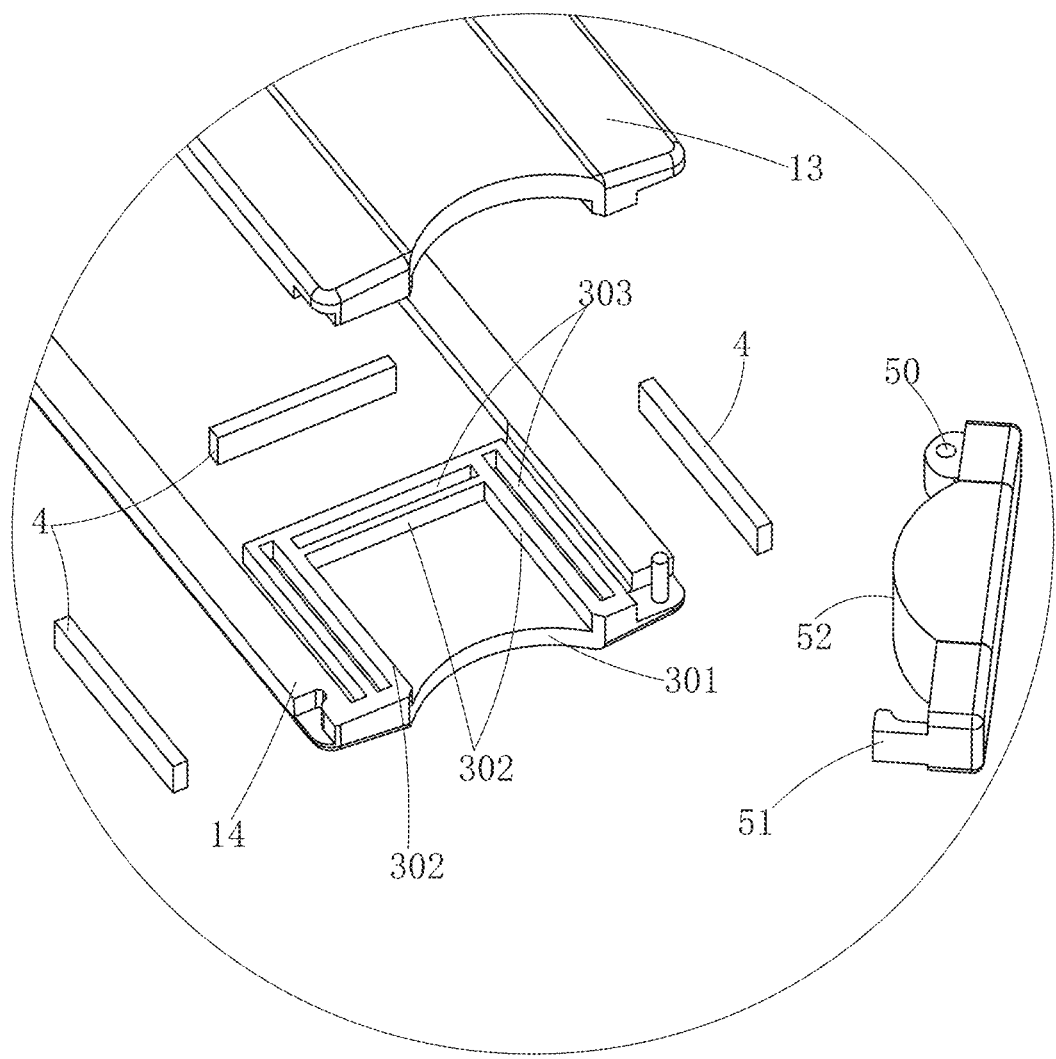
FIG. 4 is a structural schematic view 2 of a portion of the scraper according to the embodiment 1 of the present disclosure.

In order to facilitate operation performed on the cover 5 to open or close the opening 300, in the present embodiment, the cover 5 includes a hinge end 50 and a snap end 51, as shown in FIG. 3, the hinge end 50 is hingedly connected to the box body 3, and the snap end 51 is swingable around the hinge end 50. Specifically, the snap end 51 may be configured as an L-shaped snap, as shown in FIGS. 3 and 4. An outer surface of the second cavity wall 302 defines an L-shaped snap slot that can be snapped with the L-shaped snap. While in use, a force in a direction away from the operating end 10 may be applied to the snap end 51 to enable the snap end 51 to be disengaged from the L-shaped snap slot, such that the opening 300 is opened to facilitate the user to take out or store the spare blade 21.

As shown in FIG. 3, the box body 3 defines an operation notch 31 at the opening 300, the operation notch 31 is recessed in a direction towards the operating end 10. The cover 5 includes a protruding portion 52 that is mated with the operation notch 31. After the cover 5 is opened, a portion of the spare blade 21 can be exposed through the operation notch 31 to be reached by the user easily. The protruding portion 52 is correspondingly arranged on the cover 5 can unexposed the spare blade 21 after the cover 5 closes the opening 300, such that an overall structure of the scraper is more compact.

Figure 9:
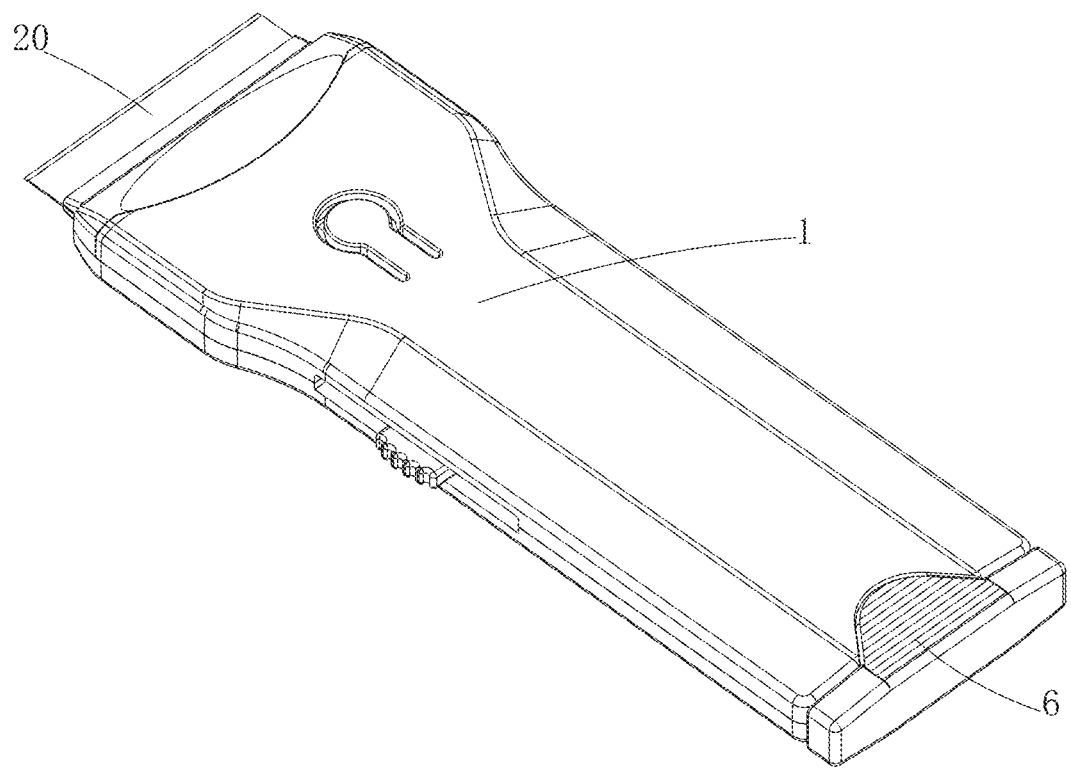
FIG. 9 is a structural schematic view 1 of the entire scraper according to an embodiment 2 of the present disclosure, where the box body is received in a connection cavity.
Figure 10:
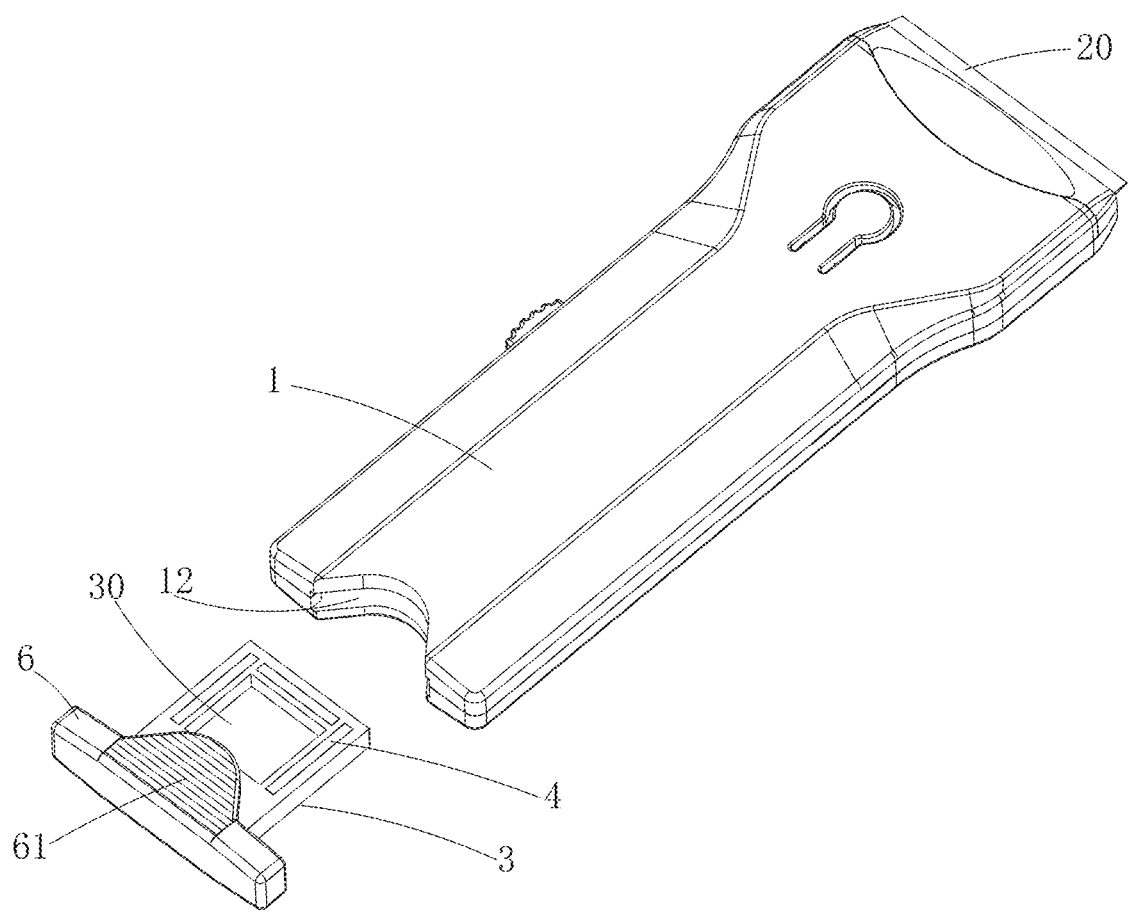
FIG. 10 is a structural schematic view 2 of the entire scraper according to the embodiment 2 of the present disclosure, where the box body is separated from the connection cavity.

In some embodiments, the box body 3 is a drawer structure, i.e., the box body 3 and the housing 1 are separatable from each other. As shown in FIGS. 9, 10, and 11, and the housing 1 defines a connection cavity 12, and the box body 3 can be movably received in the connection cavity 12. Specifically, the box body 3 may be slidably or rotatably received in the connection cavity 12. For example, an end of the box body 3 is hingedly connected with the connection cavity 12, enabling the box body 3 to be rotated into or out of the connection cavity 12. In the present embodiment, the box body 3 is slidably received in the connection cavity 12, and that is, the box body 3 can be inserted into or pulled out of the connection cavity 12. Based on the slidable connection, the opening 300 may be defined in the first cavity wall 301 as shown in FIG. 11, i.e., a surface of the spare blades 21 can be directly seen through the opening 300. In addition, when opening the opening 300, the opening 300 faces towards a side of the scraper having an operation button, so as to conform to a usage habit. That is, after pulling out the box body 3 from the connection cavity 12, the opening 300 is horizontally oriented upward, such that the spare blades 21 in the storage cavity 30 are not detached from the storage cavity 30 due to the gravity. As shown in FIG. 11, in some embodiments, the receiving slot 303 is defined in the second cavity wall 302, and the magnetic member 4 is mounted on the second cavity wall 302. In this way, the magnetic member 4 can fix the spare blades 21 in the storage cavity 30, and at the same time, enable various spare blades 21 to be separated from each other to be taken by the user easily through the opening 300. The slot opening of the receiving slot 303 is facing the same direction as the opening 300 of the storage cavity 30, allowing the magnetic member 4 to be mounted and fixed in the receiving slot 303 easily. In addition, in the thickness direction of the spare blades 21, a size of the receiving slot 303, a size of the storage cavity 30, and a size of the magnetic member 4 are approximately the same to each other, such that the magnetic field of the magnetic member 4 can comprehensively cover the spare blades 21 in the storage cavity 30.

In order to facilitate inserting the box body 3 into or pulling the box body 3 out of the connection cavity 12, the scraper further includes a handheld member 6, as shown in FIGS. 10 and 11, the handheld member 6 is connected to the box body 3. After the box body 3 is inserted into the connection cavity 12, the handheld member 6 is disposed outside of the connection cavity 12. Specifically, a limiting wall 60 is arranged on a side of the handheld member 6 connected to the box body 3, such that after the box body 3 is inserted into the connection cavity 12, the limiting wall 60 abuts against an end portion of the housing 1 to limit the handheld member 6.

As shown in FIG. 11, an anti-slip structure 61, such as an anti-slip pattern, an anti-slip bump, and the like, may be arranged on a surface of the handheld member 6 to improve friction of the surface of the handheld member 6, facilitating the user to maneuver the handheld member 6.

Obviously, the above-described embodiments show only a part of, not all of, the embodiments of the present disclosure. The accompanying drawings provide preferred embodiments of the present disclosure without limiting the scope of the present disclosure. The present disclosure may be achieved in various forms. These embodiments are provided for the purpose of understanding the present disclosure more thoroughly and comprehensively. Although the present disclosure has been described in detail with reference to the foregoing embodiments, any ordinary skilled person in the art may modify the technical solutions recorded in the foregoing specific embodiments or to make equivalent substitutions for some of the technical features therein. Any equivalent structure performed based on the contents of the specification and the accompanying drawings of the present disclosure, applied directly or indirectly in other related technical fields, shall all be equivalently included in the scope of the present disclosure.

What is claimed is:
1. A scraper, comprising:
   a housing, configured to enable an operating blade to be mounted thereon;
   a box body, defining a storage cavity to store at least one spare blade, wherein the storage cavity has an opening;
   at least one magnetic member, arranged on the box body;
   wherein the at least one magnetic member is configured to apply a magnetic adsorption force on the at least one spare blade to fix the at least one spare blade in the storage cavity to prevent the at least one spare blade from detaching off from the opening; and when the at least one spare blade comprises a plurality of spare blades, the at least one magnetic member is configured to apply the magnetic adsorption force on the plurality of spare blades to cause a gap to be formed between every two adjacent spare blades of the plurality of spare blades.

2. The scraper according to claim 1, wherein the housing and the box body are integrally formed as a one-piece structure.

3. A scraper, comprising:
a housing, configured to enable an operating blade to be mounted thereon;
a box body, defining a storage cavity to store at least one spare blade, wherein the storage cavity has an opening;
at least one magnetic member, arranged on the housing and/or the box body; and
a cover;
wherein the at least one magnetic member is configured to apply a magnetic adsorption force on the at least one spare blade to fix the at least one spare blade in the storage cavity to prevent the at least one spare blade from detaching off from the opening;
the housing and the box body are integrally formed as a one-piece structure; and
the cover is mounted on the box body; the cover is configured to close or open the opening, allowing the at least one spare blade to be taken out and placed into the storage cavity.

4. The scraper according to claim 3, wherein the cover comprises a hinge end and a snap end, the hinge end is hingedly connected to the box body, and the snap end is swingable around the hinge end.

5. The scraper according to claim 3, wherein the box body defines an operation notch at the opening; the cover is arranged with a protruding portion; when the cover covers the opening, the protruding portion is embedded in the operation notch.

6. The scraper according to claim 2, wherein the housing comprises an operating end and a connection end disposed opposite to the operating end; the operating blade is mounted at the operating end; the box body is formed by extending from the connection end.

7. The scraper according to claim 6, wherein the housing comprises an upper housing and a lower housing; when the lower housing is engaged with the upper housing, the storage cavity is formed at the connection end; the opening of the storage cavity is located at an end of the housing.

8. The scraper according to claim 7, wherein the storage cavity comprises two first cavity walls and a plurality of second cavity walls; the two first cavity walls are respectively located in the upper housing and the lower housing, the plurality of second cavity walls are connected to the two first cavity walls.

9. The scraper according to claim 8, wherein each of the plurality of second cavity walls comprises a first side wall disposed in the upper housing and a second side wall disposed in the lower housing; when the upper housing and the lower housing are engaged with each other, the first side wall and the second side wall abut against each other to form one of the plurality of second cavity walls.

10. The scraper according to claim 9, wherein at least one receiving slot is defined in an outer side of the second side wall of the lower housing and receives a respective one of the at least one magnetic member; when the upper housing is engaged to the lower housing, an inner wall of the upper housing is configured to limit a movement of the at least one magnetic member.

11. The scraper according to claim 1, wherein the storage cavity comprises a plurality of cavity walls; the at least one magnetic member is mounted on at least one of the plurality of cavity walls.

12. The scraper according to claim 11, wherein the plurality of cavity walls comprise a first cavity wall; the first cavity wall is substantially perpendicular to a thickness direction of the plurality of spare blades; the at least one magnetic member is mounted on the first cavity wall.

13. The scraper according to claim 11, wherein the plurality of cavity walls comprise a second cavity wall; the second cavity wall is substantially parallel to a thickness direction of the plurality of spare blades; the at least one magnetic member is mounted on the second cavity wall.

14. The scraper according to claim 11, wherein the plurality of cavity walls define at least one receiving slot, the at least one magnetic member is received in the at least one receiving slot.

15. The scraper according to claim 1, wherein along a thickness direction of the plurality of spare blades, a size of the at least one magnetic member is greater than or equal to a size of the storage cavity.

16. The scraper according to claim 12, wherein the opening is defined in the first cavity wall.

17. A scraper, comprising:
a housing, configured to enable an operating blade to be mounted thereon;
a box body, defining a storage cavity to store at least one spare blade, wherein the storage cavity has an opening;
at least one magnetic member, arranged on the housing;
wherein the at least one magnetic member is configured to apply a magnetic adsorption force on the at least one spare blade to fix the at least one spare blade in the storage cavity to prevent the at least one spare blade from detaching off from the opening; and
when the at least one spare blade comprises a plurality of spare blades, the at least one magnetic member is configured to apply the magnetic adsorption force on the plurality of spare blades to cause a gap to be formed between every two adjacent spare blades of the plurality of spare blades.

18. The scraper according to claim 17, wherein the housing defines a connection cavity, and the box body is slidably received in the connection cavity.

19. The scraper according to claim 18, further comprising a handheld member; wherein the handheld member is connected to the box body; when the box body is inserted into the connection cavity, the handheld member is disposed outside of the connection cavity.

20. The scraper according to claim 19, wherein a limiting wall is arranged on the handheld member; when the box body is inserted into the connection cavity, the limiting wall abuts against an end portion of the housing.

* * * * *